UNITED STATES PATENT OFFICE.

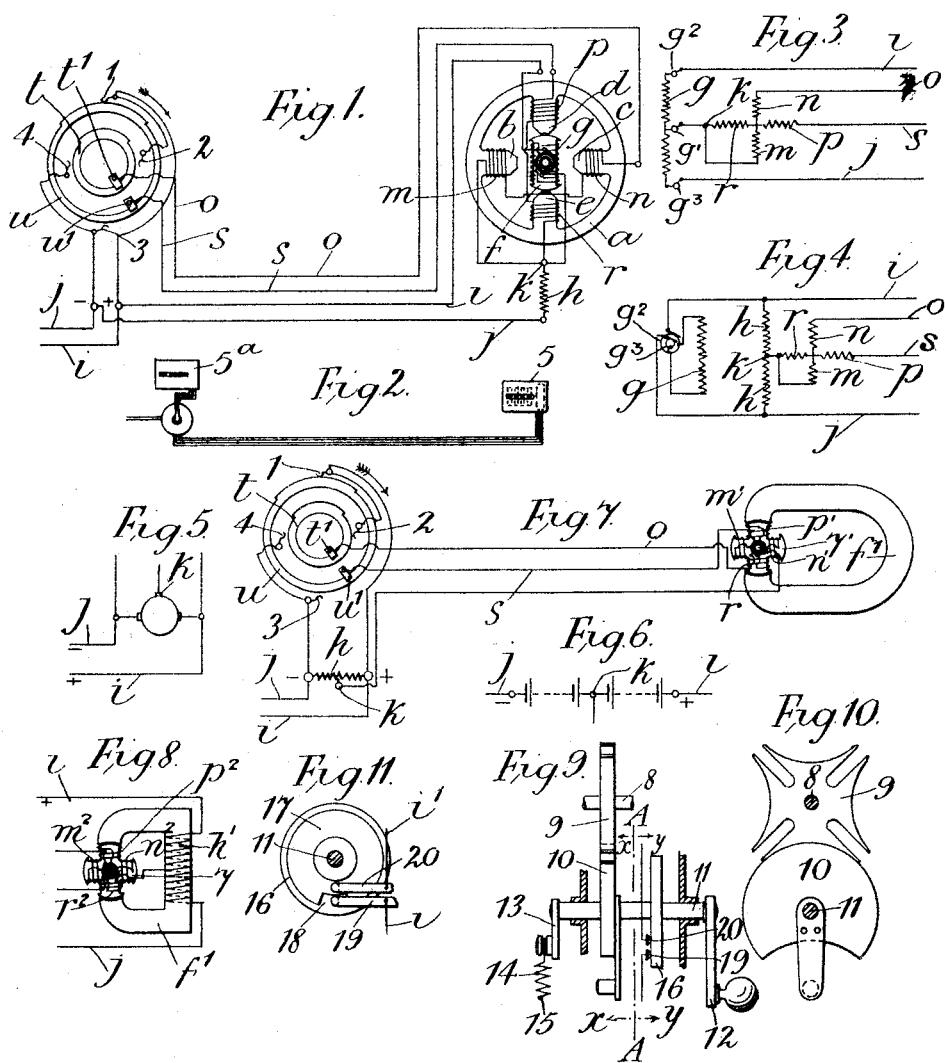

WILLIAM JOHN RICKETS, OF BROCKLEY, LONDON, ENGLAND, ASSIGNOR TO ALFRED GRAHAM & COMPANY AND WILLIAM JOHN RICKETS, BOTH OF BROCKLEY, ENGLAND.

ELECTRICAL SIGNALING SYSTEM.

1,192,685.  Specification of Letters Patent.  Patented July 25, 1916.

Application filed March 2, 1914. Serial No. 821,992.

*To all whom it may concern:*

Be it known that I, WILLIAM JOHN RICKETS, a subject of the King of Great Britain and Ireland, residing at Brockley, in the county of London, England, have invented Improvements in Electrical Signaling Systems, of which the following is a specification.

This invention relates to that class of means for the electrical transmission of orders, signals and the like, wherein angular movement of a device is obtained in a step by step manner electromagnetically in accordance with angular movement of a device at the signaling station.

The object of the invention is to provide arrangements embodying a stationary and a rotary member in which a relatively stationary magnetic field system and a field system subject to angular movement are obtained in a simplified way and the number of signaling lines required reduced as compared with other like existing arrangements. To retain the rotary member in its last attained position in order to prevent overrunning and to index it, the arrangement in some cases may be such that neither the relatively stationary field nor the rotary field is ever completely destroyed.

The relatively stationary field may be derived electromagnetically, may be a permanent one, or a permanent one supplemented electrically. The field that it subject to angular movement is derived electromagnetically by the use of windings that are connected together at one end and to a point the voltage between which and either of a pair of supply conductors is less than that between the said conductors themselves. The other ends of these windings can be connected in various ways across the pair of supply conductors through signaling leads, the circuit arrangements being such that any single winding can be energized in opposite senses by connecting its signaling lead at one time to the positive supply conductor and at another time to the negative supply conductor. By employing a suitable switching mechanism, the signaling leads can be connected singly and collectively to the supply conductors in sequence in such manner as to produce a field that changes periodically from one due to a single winding to one which is the resultant of the windings collectively.

In the accompanying drawings which exemplify how the invention can be carried into effect, Figure 1 is a semi-diagrammatic view of one arrangement. Fig. 2 is a diagram of such an arrangement amplified by a counting train and tell-tale. Figs. 3, 4, 5, 6, 7 and 8 are diagrams of modified arrangements hereinafter described. Fig. 9 is a part sectional side elevation of transmitting mechanism suitable for use in connection with the invention. Fig. 10 is a section on the line A—A of Fig. 9 looking in the direction of the arrows $x$—$x$ and Fig. 11 is a section on the same line but looking in the direction of the arrows $y$—$y$.

Referring first to Fig. 1, a magnetizable core $a$ is employed having four poles $b$, $c$, $d$, $e$ with which co-acts an armature $f$. The winding $g$ for this armature is connected in series with a resistance $h$ across two supply conductors $i$, $j$. The junction at $k$ is consequently at a potential intermediate that between the supply conductors $i$, $j$. A pair of windings $m$, $n$, shown for example as in series relationship, disposed upon the poles $b$, $c$ are connected to the point $k$ and to a signaling line $o$ while another pair of windings $p$, $r$ on the poles $d$, $e$ are similarly connected between the point $k$ and another signaling line $s$. By suitably altering the excitation of the windings $m$, $n$, $p$, $r$, the armature $f$ can be caused to occupy eight definite angular positions. Thus, if one pair of the stator poles be alone energized, the armature $f$ will become alined therewith, then if the other pair be energized simultaneously with the first named pair the armature will be deflected to coincide with the resultant magnetic field the axis whereof will lie between such poles. Then if the second named pair of poles be alone energized the armature will be moved into alinement therewith until the first named pair of poles is energized in a reverse sense to produce a resultant magnetic field that advances through yet another angle and so on. In the example, a transmitter is illustrated comprising a slip ring $t$ to which the signaling line $o$ is connected, as by a brush $t^1$, and a slip ring $u$ to which the other signaling line $s$ is similarly connected by a brush $u^1$. A pair of contacts 1, 2 are connected to the supply conductor $i$ so that, in the position shown, the signaling line $s$ is connected to the line $i$ through contact 1. With movement through an angle of 45° in the direction of the arrow, the other signaling line $o$ becomes connected to the line $i$ by way of contact 2, the former circuit being maintained; shortly thereafter a still further movement interrupts the circuits of signaling line $s$ and leaves $o$ complete, until the first contact 3, of another pair of contacts 3, 4, is reached serving to connect the signaling line $s$ to the other supply conductor $j$ and so on. The armature $f$ may be connected with a counting train as shown diagrammatically at 5 in Fig. 2, this figure also illustrating how a device $5^a$ such as just described, may be arranged in the vicinity of the transmitter to act as a tell-tale.

In lieu of connecting the armature winding $g$ in series with a resistance across the supply conductors $i, j$ as described, it may be connected directly across them, as indicated in Fig. 3, in which case, to obtain an equivalent point $k$, the windings $m, n, p, r$ may be connected to a middle tapping of the winding $g$, $g^1$ representing a slip ring through which the connection is effected, and $g^2 g^3$ slip rings through which the signaling leads are connected to opposite ends of the winding $g$. Or, as shown in Fig. 4, the armature winding $g$ may be connected across the supply conductors $i, j$ directly, as in the last case through slip rings $g^2, g^3$, the windings $m, n, r, p$ being however connected to a point $k$ intermediate in the length of a resistance $h$ permanently connected across the conductors $i, j$. In this way the number of slip rings is reduced, the slip ring $g^1$ of Fig. 3 being omitted. Such a resistance may constitute the winding of a single stroke bell, or be otherwise used to energize a device giving an audible or visual signal in known manner so that a signal will be given whenever a new order is given.

Other examples of arrangements whereby a point $k$ equivalent to that of Fig. 1 is obtainable, are shown in Figs. 5 and 6, the said point $k$ in Fig. 5 being constituted by an auxiliary brush connected to the middle point of the winding of a motor armature connected across the conductors $i, j$, whereas the point $k$ in Fig. 6 represents a mid-connection to a battery connected to the leads $i, j$.

If desired the armature $f$ (Fig. 1) may be a permanent magnet, the winding $g$ being auxiliary thereto. In such an instance, the armature will remain fairly strongly polarized even if the exciting circuit be accidentally interrupted.

Fig. 7 illustrates a modification wherein a permanent magnet $f^1$, equivalent to the armature $f$, is stationary, the windings $m^1, n^1, p^1, r^1$ being disposed upon a rotor 7. The function however, as will be readily understood, is practically the same as that of the arrangement of Fig. 1, but the resistance $h$ or its equivalent is in this case arranged in the transmitting device. In this arrangement it will be seen that only three line wires are required.

Fig. 8 illustrates an arrangement similar to that shown in Fig. 7 but wherein the resistance winding $h^1$ connected across the supply mains $i$ and $j$ and to the middle part of which each of the pairs of windings $m^2 n^2$ and $p^2 r^2$ is connected at one end, is wound upon the electromagnet $f^1$ of the signal indicating device instead of being arranged near the switching mechanism. In this case the magnet $f^1$ may be a permanent magnet.

Apparatus of the kind hereinbefore described may be so constructed that the current supply circuit shall be broken at each complete revolution of a driving shaft and also when the operating handle therefor is released so that in the latter case the circuit through the connected parts shall not be left closed when the apparatus is not in use. Figs. 9, 10 and 11 show such an arrangement. In this example, 8 is the shaft of switching mechanism such as shown in Fig. 1, driven in an intermittent manner as through a Geneva stop mechanism 9, 10 from a driving shaft 11 provided with a crank handle 12 and with a crank arm 13 that is connected to one end of a spring 14 the other end of which is fixed to a stationary support 15. Fixed to the shaft 11 is a disk 16 of insulating material carrying flush therewith a metal disk 17 formed with a notch 18. 19 and 20 are two fixed spring metal brushes the free end of one 19 of which is shown as arranged to come opposite the notch 18 in the disk 17 when the apparatus is at rest and to bear against the metal disk when this is rotated. These brushes are connected to portions $i\ i^1$ of say the positive supply conductor, the portion $i^1$ being connected to the pair of positive contacts 1 and 2 of switching mechanism such as shown in Fig. 1. The arrangement is such that normally there is a break in the circuit of the positive supply conductor but when the shaft 11 is rotated by the handle 12 both brushes 19 and 20 are caused to simultaneously bear against the metal disk 17 and so close the break in the said conductor except when the notch 18 comes opposite the free end of the brush 19 which occurs once during each rotation of the shaft 11. When the handle is released, the spring 14 acts to move the shaft 11 and metal disk 17 into the position shown in Fig. 11 in which the notch 18 is opposite the free end of the brush 19 so as to leave the current supply circuit open.

It will be understood that although the pointer of the transmitter of Fig. 1 may take up eight positions successively when the transmitting drum is rotated through a complete revolution, the Geneva stop mechanism 9, 10 as shown in Figs. 9, 10 and 11 is devised to leave the drum stationary in only four positions for indexing purposes. If it is desired that the drum should remain stationary at each position, the pointer or order drum will be geared to the motor movement axle 8 so as to make two rotations to each rotation of the said axle.

When a circuit making and breaking device such as described is used, and the resistance winding $h$ (Figs. 1 and 4) is utilized to give an audible or a visual signal this will be done each time the shaft 11 completes a revolution.

What I claim is:—

1. In signaling means, electric supply conductors, two magnetizable members between which there is adapted to be relative rotary movement, energizing windings upon one of such members connected together at one end, a resistance through which said connected ends are connected to the supply conductors, signaling leads to which the free ends of the energizing windings aforesaid are respectively connected and switching mechanism adapted to connect such windings to the supply conductors in different orders but always directly across points having a constant difference of potential less than that of the supply, one winding being first excited alone, then maintained excited simultaneously with its companion, the latter thereafter alone remaining excited and continuing thus until the first winding is re-excited but with its polarity reversed after which the said first winding alone again remains excited until the companion winding is excited with reversed polarity, whereupon the cycle of abrupt angular field variation is repeated.

2. In signaling means, electric supply conductors, two magnetizable members, between where there is adapted to be relative rotary movement, energizing windings upon one of such members connected together at one end, a resistance through which said connected ends are connected to the supply conductors, signaling leads to which the free ends of the energizing windings aforesaid are respectively connected and switching mechanism adapted to connect such windings to the supply conductors in different orders but always directly across points having a constant difference of potential less than that of the supply, thereby producing an abrupt angular step by step field variation and operating mechanism producing a step by step movement of the switching mechanism.

3. In signaling means, a stationary magnetizable member, electric supply conductors, a movable magnetizable member, an energizing coil thereon and a resistance winding connected in series with said coil across the supply conductors, energizing windings upon the stationary magnetizable member connected together at one end and to the juncture between the energizing coil and resistance winding aforesaid, and signaling leads, to which the free ends of the energizing windings of the stationary member are respectively connected, adapted to connect such windings in different orders to the supply conductors.

4. In signaling means, a stationary magnetizable member, electric supply conductors, a movable magnetizable member, an energizing coil thereon and a resistance winding connected in series with said coil across the supply conductors, energizing windings upon the stationary magnetizable member connected together at one end and to the juncture between the energizing coil and resistance winding aforesaid, signaling leads to which the free ends of the energizing windings of the stationary member are respectively connected and switching mechanism adapted to connect the signaling leads to the supply leads in different orders.

5. In signaling means, a stationary magnetizable member, electric supply conductors, a movable magnetizable member, an energizing coil thereon and a resistance winding connected in series with said coil across the supply conductors, energizing windings upon the stationary magnetizable member connected together at one end and to the juncture between the energizing coil and resistance winding aforesaid, signaling leads, to which the free ends of the energizing windings of the stationary member are respectively connected, switching mechanism adapted to connect the signaling leads to the supply leads in different orders and operating mechanism producing a step by step movement of the switching mechanism.

Signed at St. Andrew's Works, Crofton Park Road, Brockley, London, England, this eleventh day of February, 1914.

WILLIAM JOHN RICKETS.

Witnesses:
  EDWARD E. BARNARD,
  ERNEST C. W. SAUFTLEBEN.